United States Patent [19]
Offner et al.

[11] 4,288,148
[45] Sep. 8, 1981

[54] BEAM-SPLITTING OPTICAL SYSTEM

[75] Inventors: Abe Offner, Darien; David A. Markle, Norwalk, both of Conn.

[73] Assignee: The Perkin-Elmer Corporation, Norwalk, Conn.

[21] Appl. No.: 70,568

[22] Filed: Aug. 29, 1979

[51] Int. Cl.³ .................. G02B 13/00; G02B 27/18
[52] U.S. Cl. ................................. 350/453; 350/445
[58] Field of Search ............... 350/212, 202, 175 E, 350/55, 230, 453, 445

[56] References Cited

U.S. PATENT DOCUMENTS 3,357,769  12/1967  Thompson .................. 350/55 X
3,726,594  4/1973   Wakimoto .................. 350/202 X Primary Examiner—John K. Corbin
Assistant Examiner—Scott J. Sugarman
Attorney, Agent, or Firm—S. A. Giarratana; E. T. Grimes; T. P. Murphy

[57] ABSTRACT

An optical system for insertion into projection apparatus to permit viewing an image projected on an image plane without affecting its quality, size or position, including a beam-splitting element disposed in the optical path before the image plane which will transmit the radiation to the image plane and reflect a portion of the radiation reflected from the image plane in a direction which permits viewing, optical elements disposed in the optical path to correct for image displacement and aberrations caused by the beam-splitting element, said optical system being of unit power; according to one aspect of the invention the system is afocal so that it will remain at unit power when it is shifted longitudinally and the image position is insensitive to longitudinal displacement; and according to another aspect of the invention each element of the system is afocal so that the system remains at unit power and insensitive to changes in spacing between the elements.

13 Claims, 3 Drawing Figures

4,288,148

BEAM-SPLITTING OPTICAL SYSTEM

FIELD AND BACKGROUND OF INVENTION

This invention relates to optical systems and more particularly to an optical system for insertion into projection apparatus to permit viewing of an image projected on an image plane. The optical system of the invention is particularly adapted, among other possible uses, for use as an insertion in the optical train used in microprojection apparatus to provide access to the image of a mask on a light sensitive wafer in order to closely align the image with the pattern on he wafer. It will be appreciated that such insertion of an optical system must not affect the quality, size, or position of the image. A good example of an optical train used in microprojection apparatus is shown and described in the Offner U.S. Pat. No. 3,748,015, issued July 24, 1973.

SUMMARY OF THE INVENTION

In order to accomplish the desired results, the invention provides a new optical system, which is the optical equivalent of a zero thickness pellicle beam splitter. Thus, the invention provides an optical system for insertion into projection apparatus to permit the viewing of an image projected on an image plane without affecting its quality, size or position, which comprises, in one form thereof, a beam splitting element disposed in the optical path before the image plane so that the beam splitting element will transmit the radiation to the image plane and reflect a portion of the radiation reflected from the image plane in a direction which permits viewing. In addition, means are disposed in the optical path to correct for image displacement and aberrations caused by the beam splitting element. The optical system of the invention is of unit power. According to one aspect of the invention, the optical system is afocal so that it will remain at unit power when it is shifted longitudinally and the image position is insensitive to longitudinal displacement. In one form of the invention the means for correcting for image displacement and aberrations comprises first and second miniscus lense elements. According to another aspect of the invention, the optical system further includes a tiltable plane parallel plate element disposed between the meniscus elements for adjusting the position of the image laterally. Further, according to another aspect of the invention, each of the elements of the system is afocal so that the system remains at unit power and insensitive to changes in the spacing between the elements. It will be appreciated that the system, according to the invention, is corrected for coma, distortion, and lateral color, making the system insensitive to small lateral displacements and tilts.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which the disclosure is based may readily be utilized as a basis for the designing of other systems for carrying out the several purposes of the invention. It is important, therefore, that the claims be regarded as including such equivalent systems as do not depart from the spirit or scope of the invention.

Specific embodiments of the invention have been chosen for purposes of illustration and description, and are shown in the accompanying drawings forming a part of the specification.

DETAILED DESCRIPTION OF THE INVENTION

Figure 1:
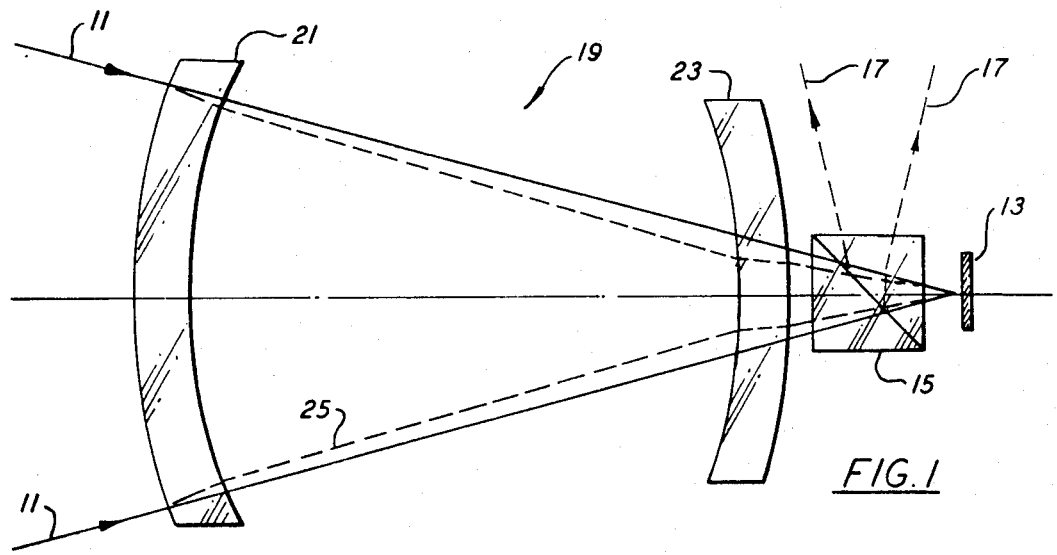
FIG. 1 is an optical schematic of a first embodiment of the present invention.

FIG. 1 illustrates a first embodiment of the present invention. Shown in solid lines are projected rays 11 which, in microprojection apparatus, image a mask on an image plane 13, e.g., a wafer. Without the requirement for being able to observe what is being imaged thereon, those rays could be projected directly onto the image plane 13. However, as previously described, there is a need to observe what is being projected in order to closely align the image of the mask with the pattern on the wafer. To accomplish this, a beam splitting element which may, for example, be a beam splitting cube 15, is inserted in the optical path. The light rays pass through this beam splitting cube to the image plane; however, because of the insertion of the beam splitting cube 15, a portion of the light rays 11 which pass through the beam splitting cube 15 and are reflected off the wafer return to the beam splitting cube and are reflected by the diagonal surface thereof to a viewing device, as indicated by the rays 17. However, the beam splitting cube causes image displacement and aberrations. In accordance with the present invention in order to correct this, in other words, to insure convergence at the same image point in the image plane 13, an afocal unity power optical system 19 comprising two meniscus elements 21 and 23, each of which is afocal, is inserted in the optical path. That is, the optical system including the beam splitting cube is unit power. By making the system afocal insures that it will remain at unit power when the conjugates are changed, as happens when it is shifted longitudinally. Also, the image position is insensitive to longitudinal displacements. It is noted that in some microprojection applications it is desirable to swing or pivot as a unit the entire optical system, elements 15, 21, 23, into and out of the path of the projected rays 11. Because the optical system is afocal and unit power, the image position is insensitive to longitudinal displacements, which result from the mechanical tolerances required for such movement.

Further, by making each component of the optical system afocal, the system remains afocal even if the separation between the lens elements changes. This is a useful, practical feature since the lens separation can be adjusted during assembly to put the image at the desired location.

The dashed lines 25 on FIG. 1 illustrate the manner in which the correction takes place. The refraction within the lenses 21 and 23 cause the rays entering the beam splitting cube 15 to deviate from the position they would normally take were the lenses 21 and 23 not present. This compensates for refraction within the beam splitting cube so that, upon exiting from the beam splitting cube 15, the rays follow the same path as they would have had all the elements of the present invention not been inserted. In this manner, the errors introduced by the beam splitting cube, which is necessary in order to view the positioning and the alignment of the mask image on the wafer, are compensated.

Figure 2:
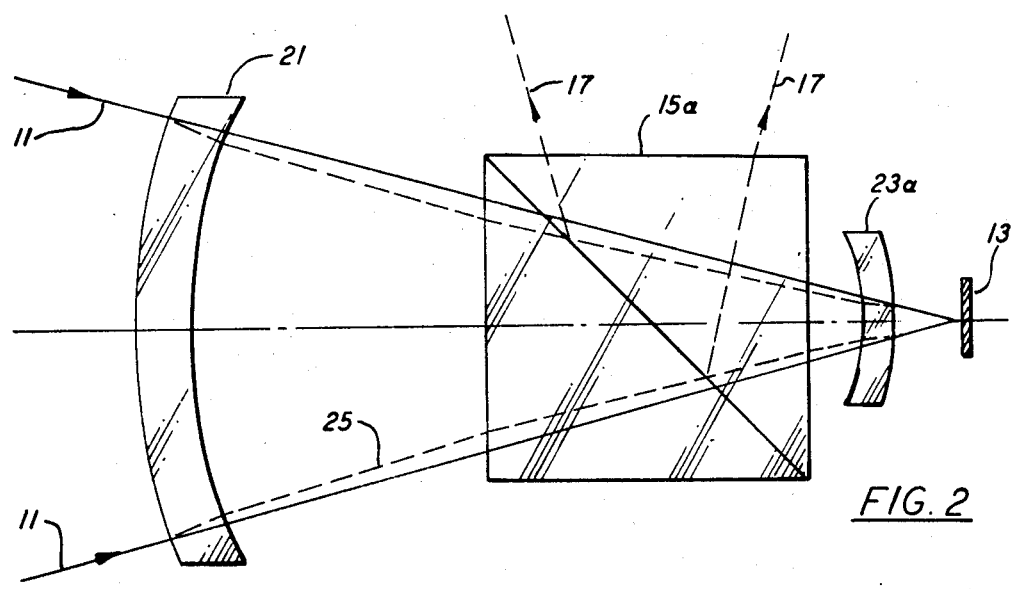
FIG. 2 is an optical schematic of an alternate embodiment of the present invention.

FIG. 2 illustrates an alternate embodiment of the present invention. In this embodiment, all of the same elements are present; however, their locations are changed. In this embodiment a beam splitting cube 15a is disposed between two meniscus lenses 21 and 23a. The two systems are optically equivalent and the same type of corrections as took place in FIG. 1 take place in the embodiment of FIG. 2.

Figure 3:
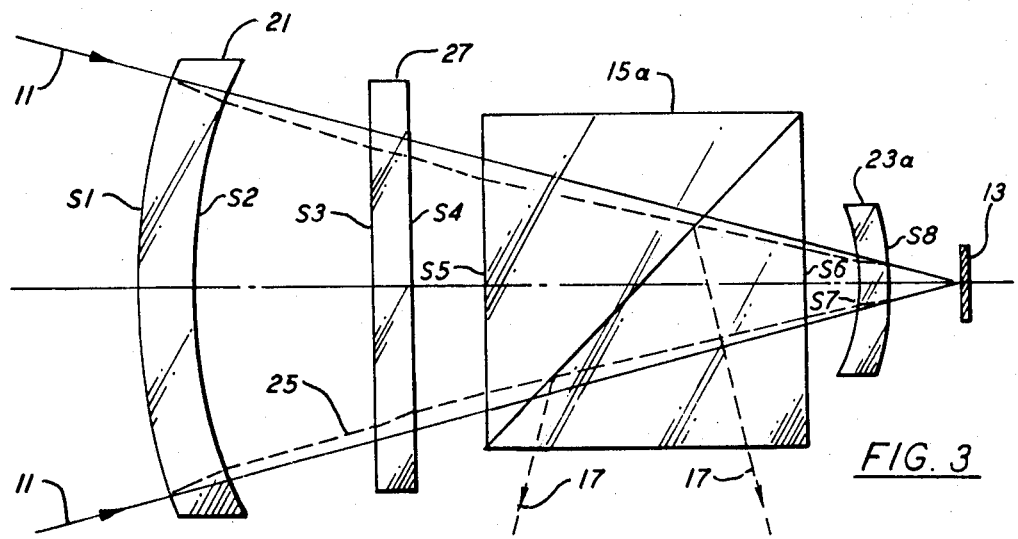
FIG. 3 is an optical schematic of still another embodiment of the invention.

Another embodiment of the invention is shown in FIG. 3. This embodiment is similar to the embodiment of FIG. 2 as it includes a beam splitting cube 15a disposed between the two meniscus lenses 21 and 23a. In addition, the embodiment of FIG. 3 includes a tiltable plane parallel plate 27 inserted between the meniscus elements 21 and 23a. The insertion of this plate provides a very useful, practical feature because it is used to adjust the position of the image laterally. This relieves the otherwise very tight tolerances on the wedge and squaring on the beam splitting cube and meniscus lenses. Thus, the system is corrected for coma distortion and lateral color, which makes it insensitive to small lateral displacements and tilts.

Table 1 is an example, indicating the construction data, of the optical system of FIG. 3.

What is claimed is:

1. A unit power optical system for insertion into projection apparatus to permit viewing an image projected on an image plane without affecting its quality, size or position comprising:
   a beam splitting element disposed in the optical path of the converging light before the image plane so that said beam splitting element will transmit the radiation to the image plane and reflect a portion of the radiation reflected from the image plane in a direction which permits viewing;
   means disposed in said optical path to correct for image displacement and aberrations caused by said beam splitting element; and
   said optical system being afocal so that said system will remain at unit power when it is shifted longitudinally and the image position is insensitive to longitudinal displacement.

2. The optical system according to Claim 1, wherein said means for correcting for image displacement and aberrations comprises first and second meniscus lens elements.

3. An optical system according to Claim 2, further comprising a tiltable plane parallel plate element disposed between the menisus elements for adjusting the position of the image laterally.

4. The optical system according to claim 2 or claim 3, wherein each element of the system is afocal so that the system remains at unit power and insensitive to changes in the spacing between the elements.

| SURFACE NUMBER | RADIUS (mm) | GLASS THICKNESS (mm) | GLASS TYPE | INDEX OF REFRACTION | | | AIR SEPARATION (mm) |
|---|---|---|---|---|---|---|---|
| | | | | .5600 μm | .5200 μm | .6000 μm | |
| S1 | 24.48(cx) | 3.93 | BK-7 | 1.5180 | 1.5202 | 1.5163 | |
| S2 | 23.14(cc) | | | | | | 28.97 |
| S3 | ∞ (plane) | 2.00 | F-2 | 1.6226 | 1.6272 | 1.6190 | |
| S4 | ∞ (plane) | | | | | | 8.74 |
| S5 | ∞ (plane) | 7.00 | F-2 | 1.6226 | 1.6272 | 1.6190 | |
| S6 | ∞ (plane) | | | | | | 2.26 |
| S7 | 14.72(cc) | 2.50 | BK-7 | 1.5180 | 1.5202 | 1.5163 | |
| S8 | 15.57(cx) | | | | | | 3.00 |

Spectral Range .5200 μm ≦ λ ≦ .6000 μm

The distance from surface S1 to the image plane is 58.4 mm and the distance from surface S8 to the image plane is 3.0 mm.

It will thus be seen that the present invention does indeed provide a new optical system for insertion into projection apparatus for viewing an image projected on an image plane without affecting its quality, size or position. Although specific embodiments have been illustrated and described, it will be obvious to those skilled in the art that various modifications may be made without departing from the spirit and scope of the invention, which is to be limited solely by the appended claims.

5. An optical system according to claim 4, wherein said beam splitting element is disposed in the optical path between said image plane and said meniscus lens elements.

6. An optical system according to claim 2, wherein said beam splitting element is disposed between said menisus lens elements.

7. An optical system according to claim 3, wherein said beam splitting element is disposed between said tiltable plane parallel plate and the second meniscus lens element.

8. An optical system according to claim 7, wherein said system is characterized by the following construction data:

| SURFACE NUMBER | RADIUS (mm) | GLASS THICKNESS (mm) | GLASS TYPE | INDEX OF REFRACTION | | | AIR SEPARATION (mm) |
|---|---|---|---|---|---|---|---|
| | | | | .5600 μm | .5200 μm | .6000 μm | |
| S1 | 24.48(cx) | 3.93 | BK-7 | 1.5180 | 1.5202 | 1.5163 | |
| S2 | 23.14(cc) | | | | | | 28.97 |
| S3 | ∞ (plane) | 2.00 | F-2 | 1.6226 | 1.6272 | 1.6190 | |
| S4 | ∞ (plane) | | | | | | 8.74 |
| S5 | ∞ (plane) | 7.00 | F-2 | 1.6226 | 1.6272 | 1.6190 | |
| S6 | ∞ (plane) | | | | | | 2.26 |
| S7 | 14.72(cc) | 2.50 | BK-7 | 1.5180 | 1.5202 | 1.5163 | |

-continued

| SURFACE NUMBER | RADIUS (mm) | GLASS THICKNESS (mm) | GLASS TYPE | INDEX OF REFRACTION .5600 μm .5200 μm .6000 μm | AIR SEPARATION (mm) |
| --- | --- | --- | --- | --- | --- |
| S8 | 15.57(cx) | | | | 3.00 |

Spectral Range .5200 μm ≦ λ ≦ .6000 μm and distance from S1 to image plane = 58.4mm and distance from S8 to image plane = 3.0mm.

9. An optical system according to claim 3, wherein said beam splitting element is disposed between said meniscus lens elements.

10. An optical system according to claim 4, wherein said beam splitting element is disposed between said meniscus lens elements.

11. A microprojection system for forming an image of a mask on a light sensitive wafer, said system comprising:
a beam splitting element disposed in the optical path of the converging light before the image plane so that said beam splitting element will transmit the radiation to the image plane and reflect a portion of the radiation reflected from the image plane in a direction which permits viewing;
first and second meniscus lens elements having their concave surfaces facing each other and being disposed in the optical path to correct for image displacement and aberrations caused by said beam splitting element; and each of said elements being afocal.

12. A microporojection system according to claim 11 wherein said beam splitting element is disposed in the optical path between said meniscus lens elements; and said system further comprises a tiltable plane parallel plate element disposed in the optical path between the first meniscus lens and the beam splitting element for adjusting the position of the image laterally.

13. A microprojection system according to claims 1, 11 or 12, wherein said beam splitting element is a beam splitting cube.

* * * * *